United States Patent [19]

Erwin, deceased et al.

[11] 4,405,113
[45] Sep. 20, 1983

[54] RECIPROCATING EXPANDABLE GATE VALVE

[75] Inventors: Robert L. Erwin, deceased, late of Farmington, N. Mex.; by Josiephine Reed Erwin, executrix, 1702 N. Mesa Verde, Farmington, N. Mex. 87401

[73] Assignee: Josiephine Reed Erwin, Farmington, N. Mex.

[21] Appl. No.: 262,791

[22] Filed: May 11, 1981

[51] Int. Cl.³ .............................................. F16K 25/00
[52] U.S. Cl. .................................... 251/168; 251/195; 251/204; 251/326; 137/246.22
[58] Field of Search ............... 251/167, 168, 187, 195, 251/207, 204, 326, 197; 137/246.22

[56] References Cited

U.S. PATENT DOCUMENTS

| | | | |
|---|---|---|---|
| 600,181 | 3/1898 | Smith | 251/167 |
| 1,134,811 | 4/1915 | Berger | 251/187 |
| 1,769,386 | 7/1930 | Orton | 251/326 |
| 2,326,988 | 8/1943 | Wilson | 251/187 |
| 2,711,877 | 6/1955 | Doster | 251/204 X |
| 3,319,661 | 5/1967 | Shindler | 251/167 X |
| 4,291,862 | 9/1981 | Alvarez | 251/167 |
| 4,314,579 | 2/1982 | Wheatley | 251/204 X |

FOREIGN PATENT DOCUMENTS

2843017 4/1979 Fed. Rep. of Germany ...... 251/203

Primary Examiner—Harold W. Weakley
Attorney, Agent, or Firm—Munson H. Lane, Jr.

[57] ABSTRACT

A valve body includes flow passageways across which a gate is movable with the gate having a central block sandwiched between outer seal blocks and a gate conduit alignable with the flow passageways of the valve body. Camming means along the edges of opposite faces of the central gate block cooperate with camming means on the seal blocks so that relative vertical movement between the central gate block and the seal block causes the seal blocks to expand outwardly into sealing contact with seal means on the ends of the passageway facing the gate. A main stem moves the entire gate as a unit with a coaxial cam drive shaft in the main stem having first and second oppositely threaded sections respectively engaged with the main stem and the central gate block to rapidly effect vertical movement of the central gate block upon rotation of the cam drive shaft. In the preferred embodiment roller members are positioned between the cam surfaces of the central gate block and the seal blocks with planar cam to cam surfaces being provided in alternative embodiments.

22 Claims, 10 Drawing Figures

RECIPROCATING EXPANDABLE GATE VALVE

BACKGROUND OF THE INVENTION

The present invention is in the field of valves and is more particularly directed to a new and improved expanding gate valve.

Expanding valves, and particularly expanding gate valves employing a gate movable into a cut-off position with portions of the gate then moving outwardly in sealing contact with the body of the valve, have been well known for many years as exemplified by prior U.S. Pat. Nos. 153,561; 408,706; 681,285; 983,960; 1,023,955; 1,057,226; 1,057,308; 1,250,041; 1,391,987; Re. 20,101; 2,326,988; 2,655,339; 2,793,831; 2,863,629; 2,986,371; 4,189,127; 4,193,577; and 4,231,440.

Prior known expanding gate valves have suffered from a number of defects and shortcomings for which the present invention provides a solution. For example, many of the prior known expanding gate valves have been extremely complicated in construction so as to be difficult and expensive to manufacture and maintain. Other valves have not proven to be functionally adequate to handling high-pressure valving operations such as in pipe lines and the like with one particular problem arising from the fact that lubricating grease employed in many of the prior valves is contaminated by the liquid being pumped and is frequently discharged into the flow through the valve so as to impair the lubrication of the movable valve components to render them difficult or impossible to operate and to also create a substantial likelihood of mechanical failure. Also, many prior valves do not provide an unobstructed path of movement as is necessary for the passage of cleaning pigs or other implements through the valve.

Therefore, it is the primary object of this invention to provide a new and improved expandable gate valve.

Achievement of the foregoing object is enabled by the preferred embodiment through the provision of a valve body consisting of three sections comprising an intermediate section sandwiched between two outer body sections with the intermediate section including a gate chamber in which a gate is mounted for reciprocation by a threaded main stem member. The intermediate valve section also includes camming surfaces on a central gate block positioned between seal blocks of a movable gate. The camming surfaces cooperate with roller followers engaged with camming surfaces on the seal blocks so that transverse relative movement of the central gate block with respect to the seal blocks effects outward movement of the seal blocks into sealing contact with seal members provided in the valve body adjacent the ends of flow passageways through which liquid would normally flow absent the presence of the gate in its closed position. The gate also includes a gate conduit alignable with the flow passageways in the valve body for permitting flow through the valve when the gate is moved to its open or non-blocking position. When the gate is in its closed position, conduit seal plates completely cover the ends of the gate conduit to prevent grease or other lubricant in the valve body from entering the gate conduit when the gate is in its closed position so as to be entrapped by the liquid flowing through the gate conduit upon its return to the open position. Thus, the loss of lubricant is effectively and efficiently precluded in a novel manner.

Outward movement of the seal blocks of the gate is quickly and effectively provided by rotation of a cam drive stem extending coaxially along the length of the main stem which has right and left hand thread sections engageable with different portions of the gate to effectively reciprocate the camming means relative to the seal block members so as to rapidly cause outward movement of the seal blocks to provide a complete seal against fluid flow through the valve.

In a second embodiment, the roller bearings are eliminated and simple inclined plane camming surfaces are used with the second embodiment being less expensive to manufacture and being completely satisfactory in operation for lower pressure installations. A third embodiment employs single inclined plane camming surfaces for moving the seal blocks outwardly.

A better understanding of the preferred embodiments of this invention will be achieved when the following detailed description is considered in conjunction with the appended drawings in which like reference numerals are used for the same parts as illustrated in the different figures.

DESCRIPTION OF THE PREFERRED EMBODIMENTS

Figure 1:
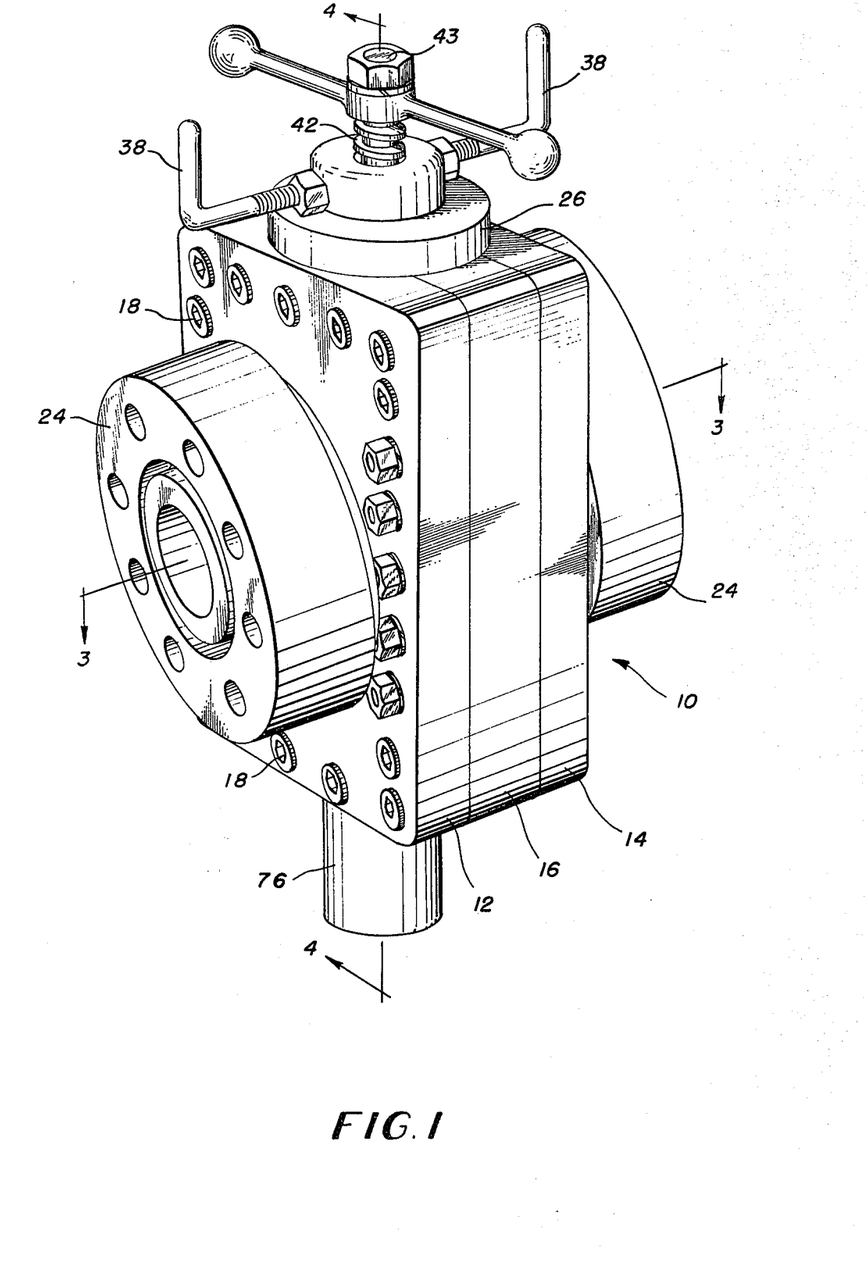
FIG. 1 is a perspective view of the preferred embodiment of the invention.
Figure 2:
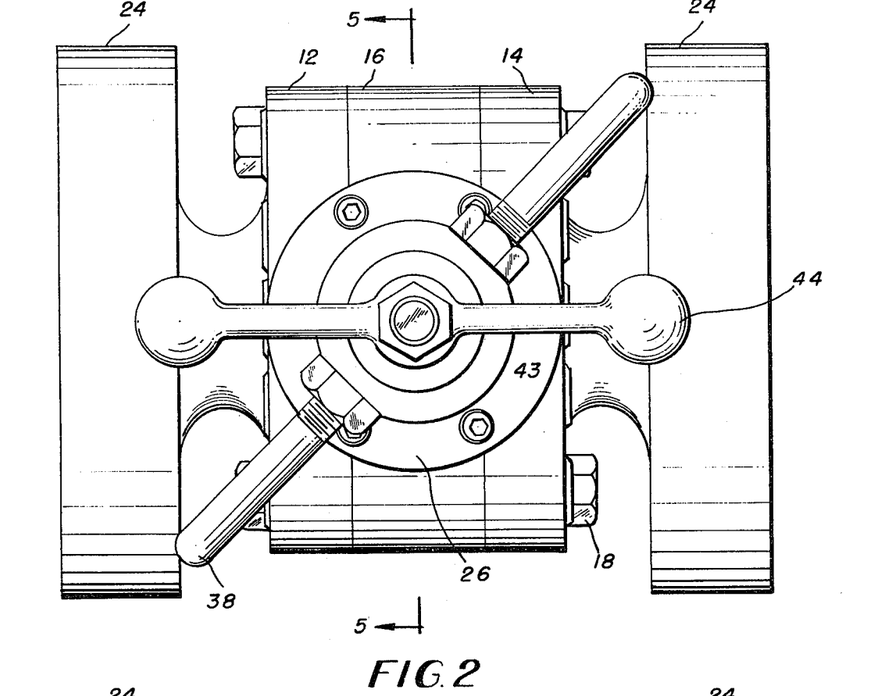
FIG. 2 is a top plan view thereof.

Attention is initially invited to FIG. 1 of the drawings which illustrates the preferred embodiment, generally designated 10, which includes a valve body formed of outer body sections 12 and 14 which are of identical construction with an intermediate body section 16 being sandwiched between the outer body sections. Body sections 12, 14, and 16 are clamped together by a plurality of machine bolt assemblies 18. The outer body sections 12 and 14 include flow passageways 20 defined by bores 22 with the inner ends of the flow passageways being defined by annular seal members 23. The outer ends of body sections 12 and 14 comprise conventional connector flanges 24 which can be connected to similar flanges on the ends of pipe or other members to which the valve is to be connected. It should be understood that the invention is not limited to a valve body having connector flanges of the type shown since any type of conventional connection configuration could be employed as required for a particular installation.

Figure 4:
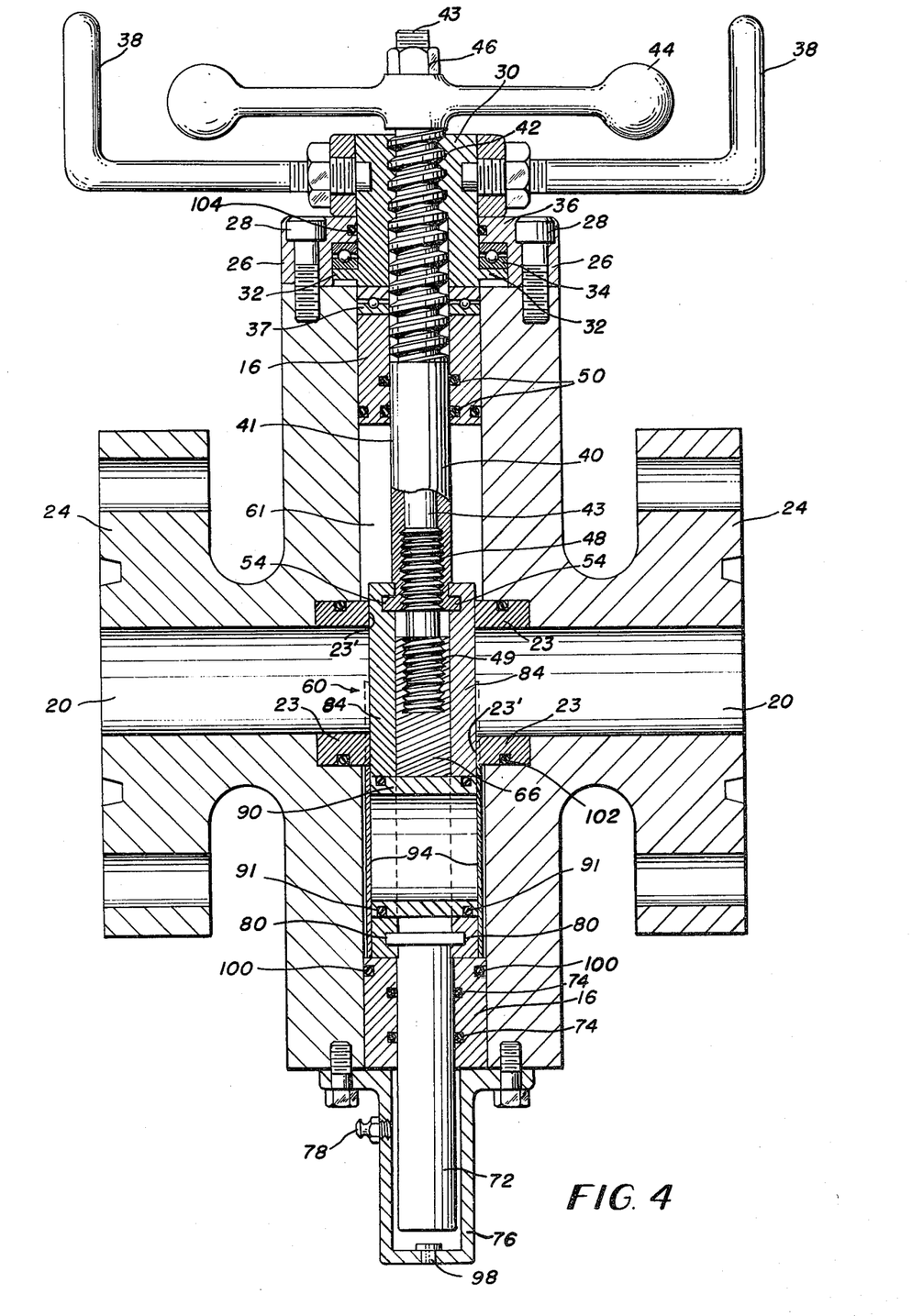
FIG. 4 is a sectional view taken along lines 4—4 of FIG. 1.

A stem retainer cap 26 is attached to the upper surfaces of the body sections 12, 14, and 16 as shown in FIG. 1 and is held in position by machine bolts 28 as best shown in FIG. 4. A main stem drive sleeve 30 extends through an axial opening in the stem retainer cap 26 and has a radial bearing flange 32 engageable with bearings 34 which have upper surfaces engageable with the under surface of an inwardly extending radial flange 36 of the stem retainer cap 26. Thus, it will be seen that the drive sleeve 30 is capable of rotation but is prevented from outward or upward movement; inward or downward movement is prevented by bearings 37 engageable with a surface of intermediate body section 16. Drive handles 38 are connected to the drive sleeve 30 for rotating same for a purpose to be discussed. A main stem 40 has relatively large threads 42 in its upper portion threadably engaged with mating threads in an axially extending threaded surface on the interior of the drive sleeve 30. Drive sleeve 30 is rotated by handle members 38 so that rotation of the drive sleeve causes the main stem 40 to move upwardly or downwardly in an axial manner. A cam drive shaft 43 is positioned internally of the main stem 40 and is threadably connected to the main stem 40 by a threaded section 48 having a right hand thread configuration; a threaded section 49 having left hand thread configuration threadably received in a central gate block 66 of a gate 60 is discussed in detail hereinafter. It should be observed that the main stem 40 includes a smooth cylindrical or sealing surface 41 engageable with seal means such as "O" rings 50 provided in the bore of the intermediate body section 16 through which the main stem extends. Rectangular restrainer plate 54 extends outwardly from the main stem into slots 55 of two outside seal blocks 84 of the gate means 60.

Figure 8:
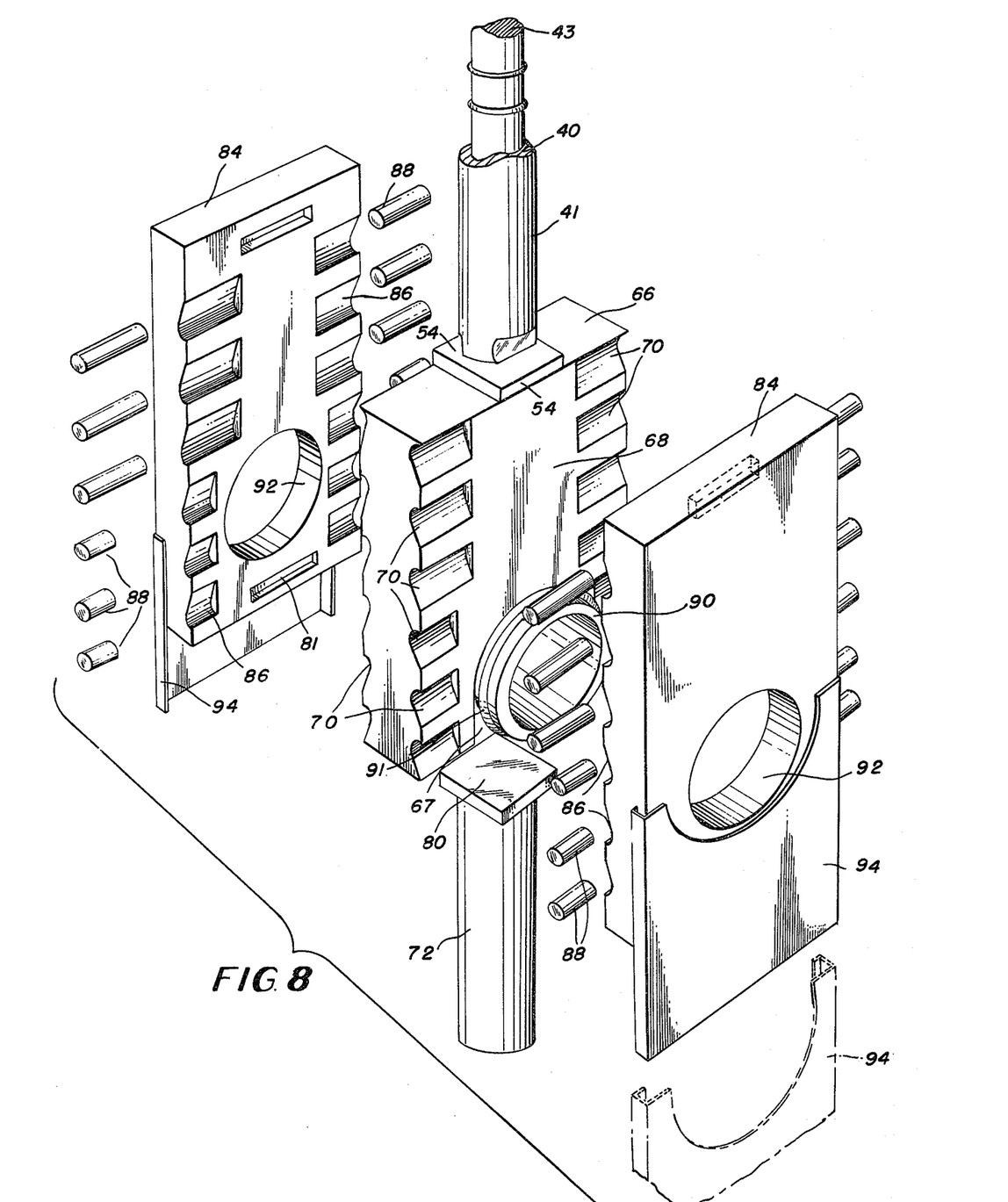
FIG. 8 is an exploded perspective view of the primary components of the preferred embodiment.

Both the main stem 40 and the cam drive shaft 43 are connected to gate means 60 which is mounted for reciprocation in a gate chamber 61 formed in the intermediate body section 16 of the valve body as shown in FIG. 4. Gate means 60 is formed of the two outside block seal members 84 between which the central gate block 66 is positioned. Central gate block 66 has a large slot 67 extending upwardly from its lower end and includes a smooth central surface 68 on opposite side faces and also includes a series of inclined cam surfaces 70 along each edge of each face as best shown in FIG. 8.

A pressure balancing stem 72 of the same diameter as main stem 40 extends downwardly below the central gate block 66 with "O" ring seal means 74 mounted in intermediate body section 16 engaging the outer surface stem 72. A lubricant retaining housing 76 having a filling fitting 78 is attached to the lower end of the valve body and receives the lower end of stem 72. Since stems 72 and 40 are of the same diameter, pressure trapped in gate chamber 61 acts on both stems in opposite directions with equal force. Operation of the gate is consequently easily effected. A carrier lug 80 extends outwardly from the stem 72 into receiving slots 81 (FIG. 8) in the outer seal block members 84 which also have camming surfaces 86 extending along their side edges in facing relationship with the camming surfaces 70 of the central gate block 66. Individual roller members 88 are positioned between each of the camming surfaces 70 and 86 so that any relative upward or downward reciprocation of the central gate block 66 with respect to the outer seal blocks 86 will result in a reactive force being generated between the surfaces 70, rollers 88, and the surfaces 86 so as to cause the outer seal blocks to move outwardly or inwardly in accordance with the direction of relative movement between the blocks 84 and the central gate block 66.

Figure 3:
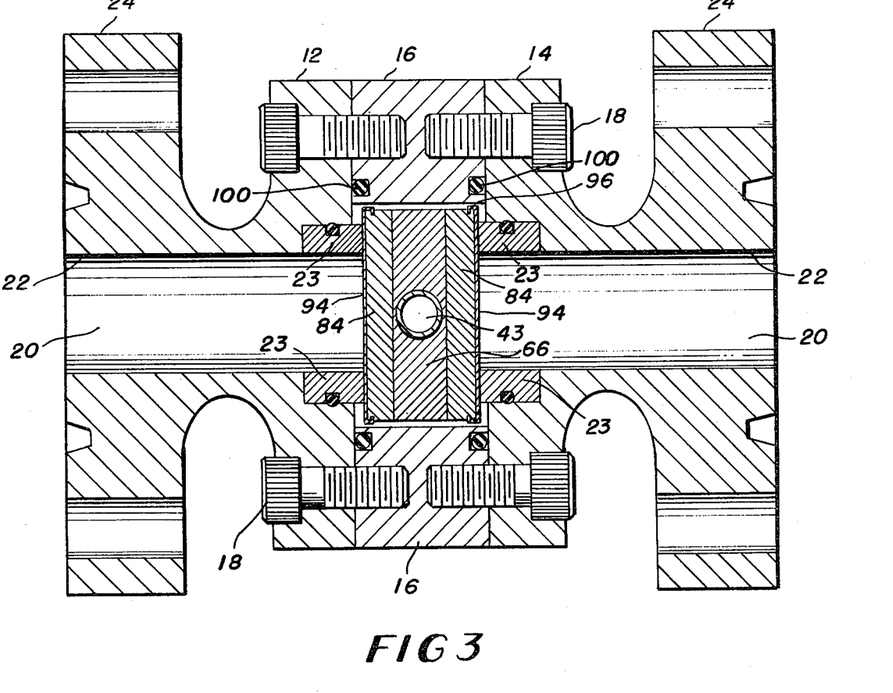
FIG. 3 is a bisecting sectional view taken along lines 3—3 of FIG. 1.

It should be observed that a gate conduit 90 extends through the openings 92 provided in the outer seal blocks 84 and is positioned in slot 67 so that seal blocks 84 can move outwardly relative to conduit 90 and central gate block 66 can reciprocate vertically relative to the conduit 90. Seal rings 91 on conduit 90 engage openings 92. Seal plates 94 are mounted fixedly in the housing and overlie the outer ends of the gate conduit 90 when it is in its lowered position shown in FIG. 4 to prevent lubricating grease in the housing from entering the conduit. However, upon upward movement of the gate assembly the conduit seal plates 94 remain fixedly positioned so that they no longer block the ends of the gate conduit when it is aligned with the flow passageways 20. It should be observed that the upper ends of the conduit seal plates 94 have semi-circular edge portions which engage the annular seal members 23 defining the inner extent of the passageways 20. Also, the conduit seal plates 94 have side edges 96 which bend around the side edges of the outer seal blocks 84 and have lips riding in slots in the outer seal blocks 84 so as to maintain the conduit seal plates 94 in position while permitting relative movement between the conduit seal plates 94 and the outer seal blocks 84 as shown in FIG. 3.

Figure 6:
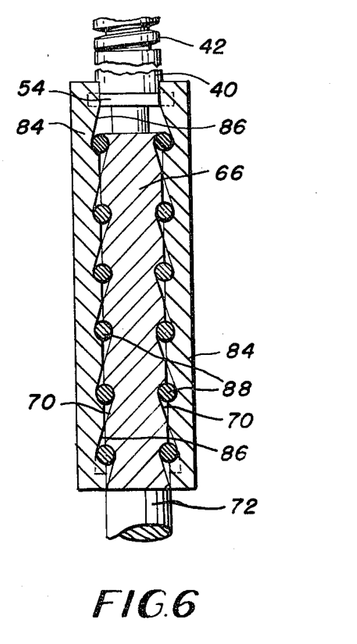
FIG. 6 is a sectional view taken along a vertical section adjacent an edge of the gate and illustrating the gate components in unexpanded condition.
Figure 7:
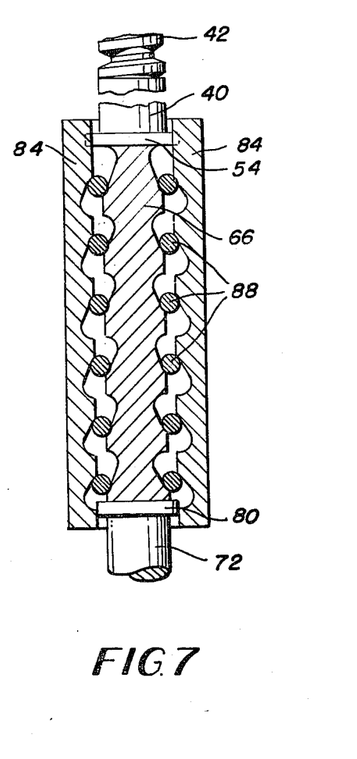
FIG. 7 is a sectional view similar to FIG. 6 but illustrating the components in a second position in which the outer sealing elements of the gate are expanded outwardly to a sealing position.

A typical cycle of operation will now be discussed with it being assumed that is it desired to close the valve. The central gate block 66 and the outer seal blocks 86 are in the positions illustrated in FIG. 6 so that the outer seal blocks are moved inwardly toward each other and the central gate block 66 to permit the gate to be easily reciprocated upwardly or downwardly by the movement of the main stem 40 through rotation of drive sleeve 30 by handle means 38. Assuming that the gate has been moved from its open position to the closed position illustrated in FIG. 4, it is then desirable to move the outer block seal members 84 outwardly so that they forcefully engage the end surfaces 23' of the annular seal members 23. The foregoing movement is achieved by rotating handle 44 and cam drive shaft 43 to cause the central gate block 66 to move upwardly under the action of threads 49 on the lower end of shaft 43 so that central gate block 66 moves relative to the outer seal blocks 84. The reactive force exerted on rollers 88 by surfaces 70 urges the outer seal blocks 84 outwardly to the position shown in FIG. 7. This result is achieved in a rapid manner by virtue of the fact that the cam drive shaft 43 is axially moved relative to main stem 40 in the direction of movement of block 66 by the operation of threads 48. Seal blocks 84 are prevented from vertical movement by the retainer plates 54 and 80 as shown in FIG. 4. In like manner, when it is desired to open the valve, the blocks 84 are retracted inwardly by rotation of shaft 43 and the main stem 40 is actuated to lift the entire gate assembly upwardly until the gate conduit 90 is aligned with the flow passageways 20. The cam drive shaft 43 is then actuated to move the outer seal blocks outwardly in the previously discussed manner so as to provide a sealed connection and flow path between the passageways 20 and the gate conduit 90.

Figures 9, 10:
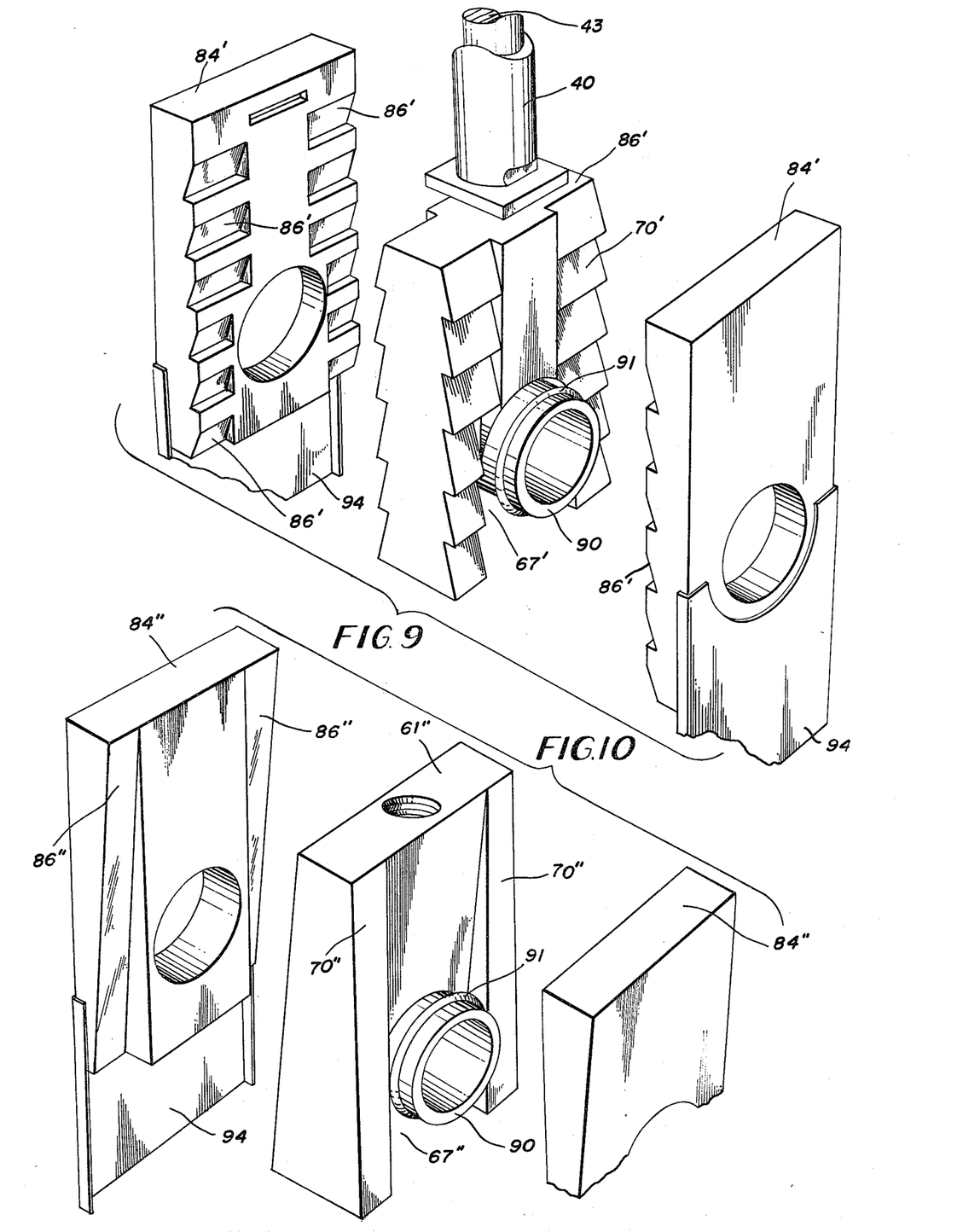
FIG. 9 is an exploded perspective view of a second low-pressure embodiment of the invention.
FIG. 10 is an exploded perspective view of a third low-pressure embodiment of the invention.

FIG. 9 illustrates a second embodiment in which a central gate block 66' has a series of canted planar camming surfaces 70' which engage cooperating camming surfaces 86' of outer seal blocks 84'. In all other respects the second embodiment is identical to the first embodiment. In operation, the second embodiment is therefore basically identical to the operation of the first embodiment with the relative movement of the cental gate block 66' relative to the outer seal blocks 84' effecting the inward and outward movement of the outer gate blocks for effecting sealing with the valve housing.

FIG. 10 illustrates a third embodiment in which only a single camming surface 70" is provided along adjacent edges of a central gate block 66" for engagement with cooperating single camming surfaces 86" of outer seal blocks 84". Here again, the operation is basically the same as that of the first embodiment with relative movement between the central gate block 66" with respect to the outer seal blocks 86" effecting the necessary outward movement of the seal blocks.

All of the embodiments could be modified to provide a grease conduit in stem 72 to permit the introduction of grease into chamber 61. This could be accomplished by bleeding any pressure from chamber 61 when the passage 20 is sealed in either full open or full closed position following which the lubricant could be introduced into the chamber.

In addition to the features of the valve already described, the bottom of the lubricant retaining housing 76 is provided with a breather valve 98 which vents the inside of the housing 76 to atmosphere in order to prevent vacuum and pressure buildups within the housing as the pressure balancing stem 72 is reciprocated.

Figure 5:
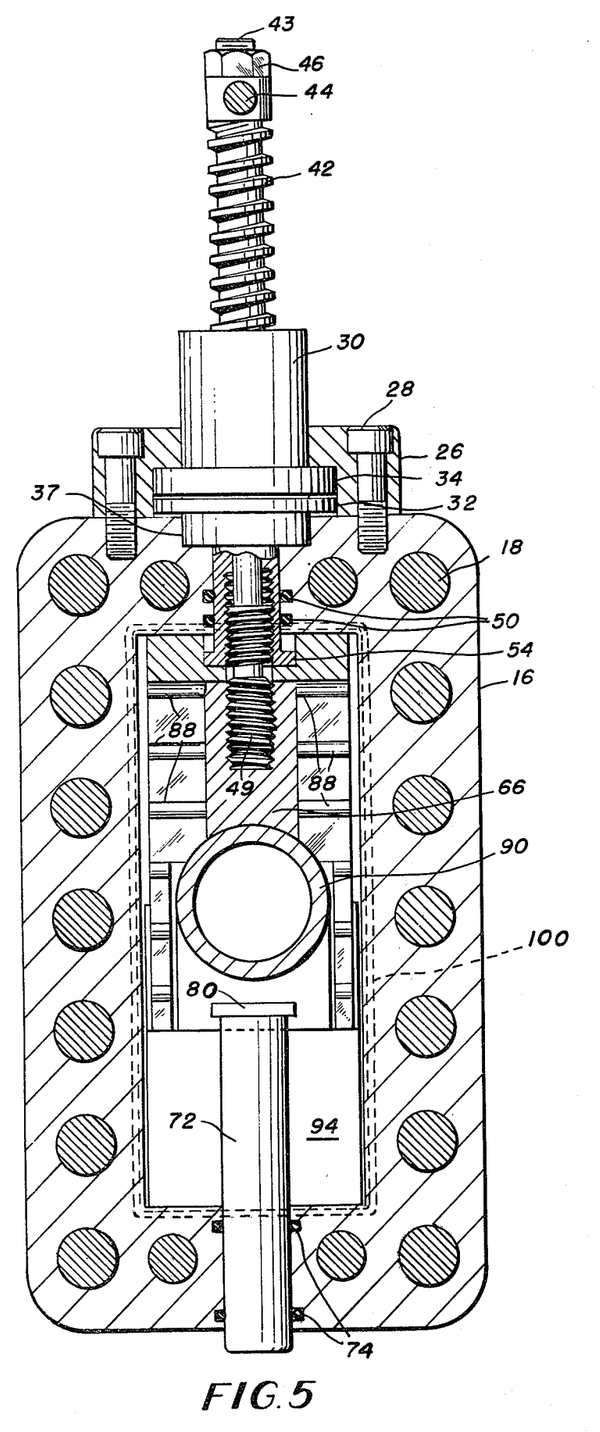
FIG. 5 is a sectional view taken along lines 5—5 of FIG. 2.

Rectangular O-ring seals 100 are provided in rectangular grooves in opposite faces of the intermediate valve body section 16 in order to form seals between the intermediate body section 16 and the outer body sections 12 and 14. The rectangular outline of one of the O-ring seals 100 is shown in FIG. 5 of the drawings.

An O-ring seal 102 is provided in an annular groove about each of the annular seal members 23 to prevent fluid leakage between each annular seal member 23 and the surface of the counterbore in which the seal member 23 is located.

An O-ring seal 104 is provided in an annular groove formed in the inner face of the flange 36 of the stem retainer cap 26 in order to seal the stem retainer cap relative to the main stem drive sleeve, or nut, 30.

Therefore, it will be appreciated that the subject invention provides a simple and rugged construction that is economical to manufacture and maintain but which provides a highly effective functional operation. Numerous other modifications of the preferred embodiments will undoubtedly occur to those of skill in the art and it should be understood that the spirit and scope of the invention is to be limited solely by the appended claims.

I claim:

1. A gate type valve unit comprising:
    a valve body including first and second aligned flow passageways having facing spaced end portions separated by a transverse gate chamber;
    a gate mounted for reciprocation along a gate path of movement in said gate chamber between a closed position blocking said spaced end portions from communication with each other and an open position permitting communication of said end portions, said gate including:
        first and second seal blocks mounted for movement transversely with respect to said gate path of movement toward and away from said facing spaced end portions of said flow passageways when said gate is in its closed position;
        a central gate block positioned between said first and second seal blocks;
        a gate conduit extending through said gate and aligned with said facing end portions of said flow passageways when said gate is in its open position for permitting flow from one of said flow passageways through said gate conduit to the other of said flow passageways, said gate conduit being slidably and sealingly mounted in each said seal block thereby permitting said transverse movement of each said seal block when said gate is in its closed position; and camming means internally of said gate for moving said first and second seal blocks toward said facing end surfaces of said flow passageways to effect sealing contact therewith;
    main stem means connected on one end to said gate and mounted for reciprocation in said valve body for effecting movement of said gate between its closed position and its open position; and
    cam drive means mounted for axial movement relative to said main stem means for actuating said camming means, said cam drive means comprising a cam drive shaft having a first thread section threadably mounted in said main stem means for effecting axial movement of said cam drive shaft relative to said main stem in response to rotation of said cam drive shaft, and said gate additionally including connector means between said main stem and said seal blocks precluding relative movement of the seal blocks in the direction of the axis of the main stem while permitting relative movement perpendicular to the axis of the main stem and wherein said camming means comprises first and second cam means extending along vertical side edges of first and second faces of said central gate block facing said seal blocks and having a threaded aperture in which one end of said cam drive shaft is threadably received so that rotation of said cam drive shaft effects movement of said central gate block relative to said seal blocks in a direction parallel to the axis of the main stem and wherein said seal blocks each include first and second cam means extending along vertical side edges thereof drivingly engaged with the cam means of the central gate block.

2. A gate valve unit as set forth in claim 1 wherein the inner diameter of the gate conduit is the same as the diameter of the flow passageways and further including first and second conduit seal plates respectively fixedly positioned in said valve body on opposite sides of said gate in surface to surface contact with the sides of said seal blocks for blocking the ends of said gate conduit and preventing lubricant in said valve body from entering said gate conduit when said gate is in its closed position.

3. A gate valve unit as set forth in claim 1 wherein said valve body additionally includes:
    first and second outer body sections each respectively including one of said flow passageways; and
    an intermediate body section sandwiched between said first and second outer body sections with said gate chamber being formed in said intermediate body section.

4. A gate valve unit as set forth in claim 1 additionally including a plurality of rollers drivingly positioned between the cam means on the central gate block and the cam means of the seal blocks.

5. A gate valve unit as set forth in claim 1 wherein said cam means on the central gate block and said cam means on the seal blocks comprise a series of canted planar camming surfaces.

6. A gate valve unit as set forth in claim 1 wherein said cam means on the central gate block and the cam means on the seal blocks comprise singular cam surfaces extending along edges of the respective blocks.

7. A valve unit as set forth in claim 1 wherein said central gate block includes an open bottomed slot extending upwardly from its lower end and fitted over said gate conduit to permit said central gate block to move vertically with respect to said gate conduit and wherein said first and second seal blocks include apertures in their lower portions through which said gate conduit snugly extends so as to preclude any substantial relative vertical movement between said seal blocks and said gate conduit.

8. A gate valve unit as set forth in claim 7 additionally including a plurality of rollers drivingly positioned between the cam means on the central gate block and the cam means of the seal blocks.

9. A gate valve unit as set forth in claim 7 wherein said cam means on the central gate block and said cam means on the seal blocks comprise a series of canted planar camming surfaces.

10. A gate valve unit as set forth in claim 7 wherein said cam means on the central gate block and the cam means on the seal blocks comprise singular cam surfaces extending along edges of the respective blocks.

11. A gate type valve unit comprising:
a valve body including first and second aligned flow passageways having facing spaced end portions separated by a transverse gate chamber;
a gate mounted for reciprocation along a gate path of movement in said gate chamber between a closed position blocking said spaced end portions from communication with each other and an open position permitting communication of said end portions, said gate including:
first and second seal blocks mounted for movement transversely with respect to said gate path of movement toward and away from said facing spaced end portions of said flow passageways when said gate is in its closed position;
a central gate block positioned between said first and second seal blocks;
a gate conduit extending through said gate and aligned with said facing end portions of said flow passageways when said gate is in its open position for permitting flow from one of said flow passageways through said gate conduit to the other of said flow passageways, said gate conduit being slidably and sealingly mounted in each said seal block thereby permitting said transverse movement of each said seal block when said gate is in its closed position; and camming means internally of said gate for moving said first and second seal blocks toward said facing end surfaces of said flow passageways to effect sealing contact therewith;
main stem means connected to one end to said gate and mounted for reciprocation in said valve body for effecting movement of said gate between its closed position and its open position;
cam drive means mounted for axial movement relative to said main stem means for actuating said camming means, wherein said cam drive means comprises a cam drive shaft having a first thread section threadably mounted in said main stem means for effecting axial movement of said cam drive shaft relative to said main stem in response to rotation of said cam drive shaft;
wherein said gate additionally includes connector means between said main stem and said seal blocks precluding relative movement of the seal blocks in the direction of the axis of the main stem while permitting relative movement perpendicular to the axis of the main stem and further including a threaded aperture in an upper surface of said central gate block receiving a second thread section of said cam drive section of opposite configuration from said first thread section so that rotation of said cam shaft effects movement of said central gate block relative to said seal blocks, wherein said cam means comprises cooperating facing cam surfaces along edges of said central gate block and said seal blocks; and
wherein said central gate block includes an open bottomed slot extending upwardly from its lower end and fitted around said gate conduit to permit said central gate block to move vertically with respect to said gate conduit and wherein a portion of said cam surfaces on said central gate block extends vertically along both sides of said gate conduit and wherein said first and second seal blocks include apertures in their lower portions through which said gate conduit snugly extends so as to preclude any substantial relative vertical movement between said seal blocks and said gate conduit.

12. A gate-type valve unit comprising:
a valve body including first and second aligned flow passageways having facing spaced end portions separated by a transverse gate chamber;
a gate mounted for reciprocation along a gate path of movement in said gate chamber between a closed position blocking said spaced end portions from communication with each other and an open position permitting communication of said end portions, said gate including:
first and second seal blocks mounted for movement transversely with respect to said gate path of movement toward and away from said facing spaced end portions of said flow passageways when said gate is in its closed position;
a central gate block positioned between said first and second seal blocks;
a gate conduit extending through said gate and aligned with said facing end portions of said flow passageways when said gate is in its open position for permitting flow from one of said flow passageways through said gate conduit to the other of said flow passageways, said gate conduit being slidably and sealingly mounted in each said seal block thereby permitting said transverse movement of each said seal block when said gate is in its closed position; and camming means internally of said gate for moving said first and second seal blocks toward said facing end surfaces of said flow passageways to effect sealing contact therewith;
main stem means connected on one end to said gate and mounted for reciprocation in said valve body for effecting movement of said gate between its closed position and its open position;

cam drive means mounted for axial movement relative to said main stem means for actuating said camming means;

wherein the inner diameter of the gate conduit is the same as the diameter of the flow passageways and further including first and second conduit seal plates respectively fixedly positioned in said valve body on opposite sides of said gate in surface to surface contact with the sides of said seal blocks for blocking the ends of said gate conduit and preventing lubricant in said valve body from entering said gate conduit when said gate is in its closed position; and wherein said first and second conduit seal plates have side edge portions slidably positioned in slots formed on the associated seal blocks.

13. A gate type valve unit comprising:
a valve body including first and second aligned flow passageways having facing spaced end portions separated by a transverse gate chamber;
a gate mounted for reciprocation along a gate path of movement in said gate chamber between a closed position blocking said spaced end portions from communication with each other and an open position permitting communication of said end portions, said gate including:
first and second seal blocks mounted for movement transversely with respect to said gate path of movement toward and away from said facing spaced end portions of said flow passageways when said gate is in its closed position;
a central gate block positioned between said first and second seal block members; and
camming means internally of said gate responsive to reciprocal movement of said central gate block for moving said first and second seal blocks toward said facing end surfaces of said flow passageways to effect sealing contact therewith;
main stem means connected on one end to said gate and mounted for reciprocation in said valve body for effecting movement of said gate between its closed position and its open positions; and
cam drive means mounted for axial movement relative to said main stem means for actuating said camming means comprising a cam drive shaft having a first thread section threadedly mounted in said main stem means and a second thread section of different hand than said first thread section threadedly mounted to said central gate block to provide for movement of the central gate block independently of the main valve stem;
whereby upon reciprocation of the gate to the closed position, rotation of the cam drive shaft effects movement of said central gate block relative to said seal blocks in a direction parallel to the axis of the main stem sufficient to actuate said camming means for effecting movement of said seal blocks to said closed position blocking the aligned flow passageways.

14. A gate valve unit as set forth in claim 13 wherein a gate conduit extends through said gate and is aligned with said facing end portions of said flow passageways when said gate is in its open position for permitting flow from one of said flow passageways through said gate conduit to the other of said flow passageways and further includes first and second conduit seal plates respectively fixedly positioned in said valve body on opposite sides of said gate in surface to surface contact with the sides of said seal blocks for blocking the ends of said gate conduit and preventing lubricant in said valve body from entering said gate conduit when said gate is in its closed position.

15. A gate valve unit as set forth in claim 14 wherein said first and second conduit seal plates have side edge portions slidably positioned in slots formed on the associated seal blocks.

16. A gate valve unit as set forth in claim 13 wherein said gate additionally includes:
a gate conduit extending through said gate and aligned with said facing end portions of said flow passageways when said gate is in its open position for permitting flow from one of said flow passageways through said gate conduit to the other of said flow passageways; and
said central gate block includes an open bottomed slot extending upwardly from its lower end and fitted over said gate conduit to permit said central gate block to move vertically with respect to said gate conduit.

17. A gate valve unit as set forth in claim 16 additionally including a plurality of rollers drivingly positioned between the cam means on the central gate block and the cam means of the seal blocks.

18. A gate valve unit as set forth in claim 16 wherein said cam means on the central gate block and said cam means on the seal blocks comprise a series of canted planar camming surfaces.

19. A gate valve as set forth in claim 18 wherein individual roller means are drivingly positioned between each of the camming surfaces of said series.

20. A gate valve as set forth in claim 16 wherein said cam means on the central gate block and the cam means on the seal blocks comprise singular cam surfaces extending along edges of the respective blocks.

21. A gate valve as set forth in claim 13 wherein said gate additionally includes a gate conduit extending through said gate and aligned with said facing end portions of said flow passageways when said gate is in its open position for permitting flow from one of said flow passageways through said gate conduit to the other of said flow passageways.

22. A gate type valve unit comprising:
a valve body including first and second aligned flow passageways having facing spaced end portions separated by a transverse gate chamber;
a gate mounted for reciprocation along a gate path of movement in said gate chamber between a closed position blocking said spaced end portions from communication with each other and an open position permitting communication of said end portions, said gate including:
first and second seal blocks mounted for movement transversely with respect to said gate path of movement toward and away from said facing spaced end portions of said flow passageways when said gate is in its closed position;
a central gate block positioned between said first and second seal blocks;
a gate conduit extending through said gate and aligned with said facing end portions of said flow passageways when said gate is in its open position for permitting flow from one of said flow passageways through said gate conduit to the other of said flow passageways;

said central gate block having an open bottomed slot extending upwardly from its lower end and fitted around said gate conduit to permit said central gate block to move vertically with respect to said gate conduit; and camming means internally of said gate for moving said first and second seal blocks toward said facing end surfaces of said flow passageways to effect sealing contact therewith, said camming means comprising cooperating facing cam surfaces along edges of said central gate block and said seal blocks and wherein a portion of said cam surfaces on said central gate block extend vertically along both sides of said gate conduit;

main stem means connected on one end to said gate and mounted for reciprocation in said valve body for effecting movement of said gate between its closed position and its open position; and cam drive means mounted for axial movement relative to said main stem means for actuating said camming means.

* * * * *